US012798716B2

(12) United States Patent
Chen

(10) Patent No.: US 12,798,716 B2
(45) Date of Patent: Nov. 17, 2026

(54) BICYCLE HANDLEBAR AND MANUFACTURING METHOD THEREOF

(71) Applicant: YEU CHUEH INDUSTRY CO., LTD., Taichung City (TW)

(72) Inventor: Kun-Tien Chen, Taichung City (TW)

(73) Assignee: YEU CHUEH INDUSTRY CO., LTD., Taichung City (TW)

( * ) Notice: Subject to any disclaimer, the term of this patent is extended or adjusted under 35 U.S.C. 154(b) by 364 days.

(21) Appl. No.: 18/756,259

(22) Filed: Jun. 27, 2024

(65) Prior Publication Data

US 2025/0121908 A1 Apr. 17, 2025

(30) Foreign Application Priority Data

Oct. 13, 2023 (TW) ................................ 112139209

(51) Int. Cl.

*B62K 21/12* (2006.01)
*B29C 43/10* (2006.01)
*B29L 31/30* (2006.01)

(52) U.S. Cl.

CPC ............ *B62K 21/125* (2013.01); *B29C 43/10* (2013.01); *B29L 2031/3091* (2013.01)

(58) Field of Classification Search

CPC ................. B62K 21/125; B29C 43/10; B29L 2031/3091
USPC .......................................................... 138/130
See application file for complete search history.

(56) References Cited

U.S. PATENT DOCUMENTS

| | | | | |
|---|---|---|---|---|
| 489,714 A * | 1/1893 | Palmer | B60C 5/08 | 264/130 |
| 532,902 A * | 1/1895 | Palmer | F41H 5/0485 | 428/113 |
| 4,900,048 A * | 2/1990 | Derujinsky | B62K 19/28 | 280/281.1 |
| 7,891,687 B2 * | 2/2011 | Schmider | B62K 19/30 | 280/281.1 |
| 2006/0145446 A1 * | 7/2006 | Schmider | B62K 21/12 | 280/281.1 |
| 2008/0110291 A1 * | 5/2008 | Vitek | B62K 21/26 | 74/551.9 |
| 2015/0004412 A1 * | 1/2015 | Jankura | B62K 19/30 | 428/377 |

* cited by examiner

*Primary Examiner* — David R Deal
(74) *Attorney, Agent, or Firm* — MUNCY, GEISSLER, OLDS & LOWE, P.C.

(57) ABSTRACT

A bicycle handlebar and a manufacturing method thereof are provided, wherein the manufacturing method includes steps of: wrapping first carbon fiber layers around a first mandrel to form a first component; placing the first component within an assembly groove of a second mandrel, wrapping second carbon fiber layers around the second mandrel and the first component to form a second component; removing the second mandrel from the second component to form an assembled component including a second channel; inserting the connection member into the second channel of each of two said assembled components to form a preformed tube; placing the preformed tube into a mold for molding through a heating and pressing process; and removing the first mandrel from each of the two said assembled components to form a first channel.

10 Claims, 5 Drawing Sheets

BICYCLE HANDLEBAR AND MANUFACTURING METHOD THEREOF

BACKGROUND OF THE INVENTION

Field of the Invention

The present invention relates to a bicycle handlebar and a manufacturing method thereof.

Description of the Prior Art

Various control cables are installed on a bicycle to allow the rider to control, from the handlebars, various mechanisms such as brake the mechanism, gear mechanism, etc. Conventionally, the control cables are arranged along the outer side of the frame, which makes them susceptible to damage from external objects or persons. Additionally, this often results in messy cable arrangements, affecting performance and the overall aesthetics of the bike.

Therefore, some manufacturers have adopted internal arrangement of control cables through the frame to address these issues. However, it still has shortcomings. For example, during cable routing, there is problem of precisely controlling the direction of the cables within the frame, leading to difficulty in cable arrangement. Moreover, when there are other components or wires within the frame, the control cables may encounter obstacles or get tangled.

The present invention is, therefore, arisen to obviate or at least mitigate the above-mentioned disadvantages.

SUMMARY OF THE INVENTION

The main object of the present invention is to provide a bicycle handlebar and a manufacturing method thereof, which is capable of producing tubular structures with channels having dedicated space for routing and guiding cables.

To achieve the above and other objects, a manufacturing method of a bicycle handlebar is provided, wherein the manufacturing method includes steps of: preparing a first mandrel and a plurality of first carbon fiber layers, wrapping the plurality of first carbon fiber layers around the first mandrel to form a first component; preparing a second mandrel and a plurality of second carbon fiber layers, the second mandrel having an assembly groove, placing the first component within the assembly groove, wrapping the plurality of second carbon fiber layers around the second mandrel and the first component to form a second component; removing the second mandrel from the second component to form an assembled component, the assembled component including a second channel; preparing a connection member and two said assembled components, inserting the connection member into the second channel of each of the two said assembled components to form a preformed tube; placing the preformed tube into a mold for molding through a heating and pressing process; and removing the first mandrel from each of the two said assembled components to form a first channel to obtain a finished product.

To achieve the above and other objects, a bicycle handlebar manufactured by the aforementioned manufacturing method is provided, wherein the bicycle handlebar includes: two connecting assemblies, each of the two connecting assemblies including an outer tubular member and an inner tubular member, the outer tubular member including the plurality of second carbon fiber layers and having the second channel, the inner tubular member being positioned on an inner wall of the second channel and including the plurality of first carbon fiber layers and having the first channel, the inner tubular member including at least one first opening and a plurality of second openings opened in the outer tubular member; the connection member inserted into the second channels of the two connecting assemblies respectively; and a reinforcement member including the plurality of third carbon fiber layers, and covering the junction of the two connecting assemblies.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
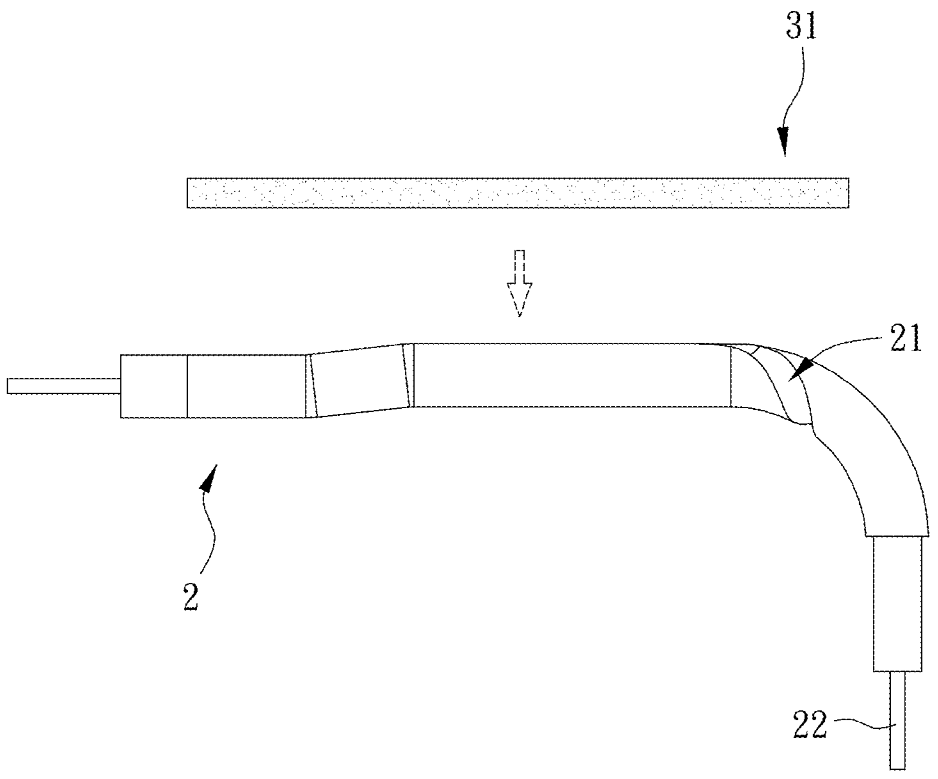
FIG. 1 is a schematic diagram of a first component a first mandrel according to an exemplary embodiment of the present invention.
Figure 2:
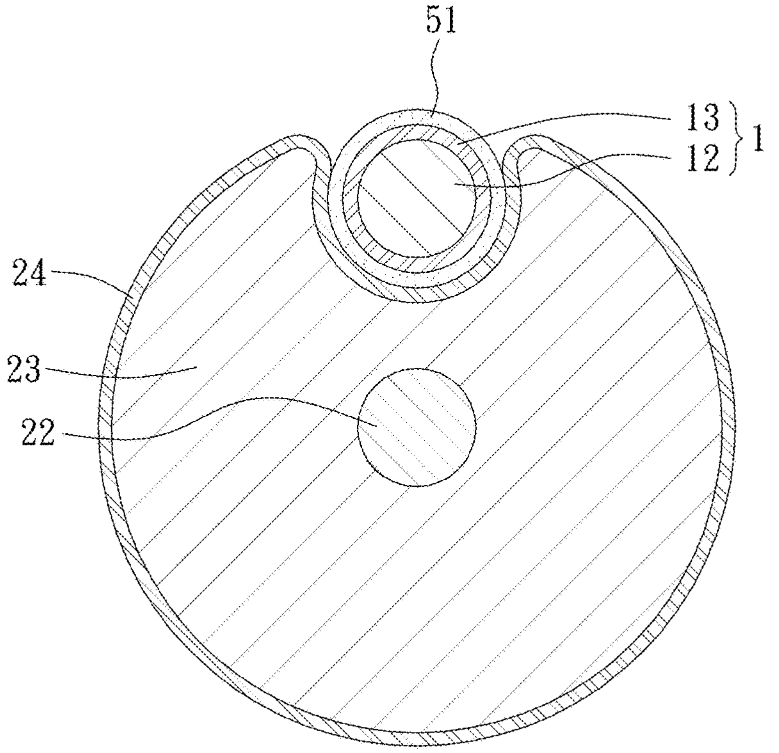
FIGS. 2 to 4 are drawings showing steps of manufacturing an assembled component according to an exemplary embodiment of the present invention.
Figure 3:
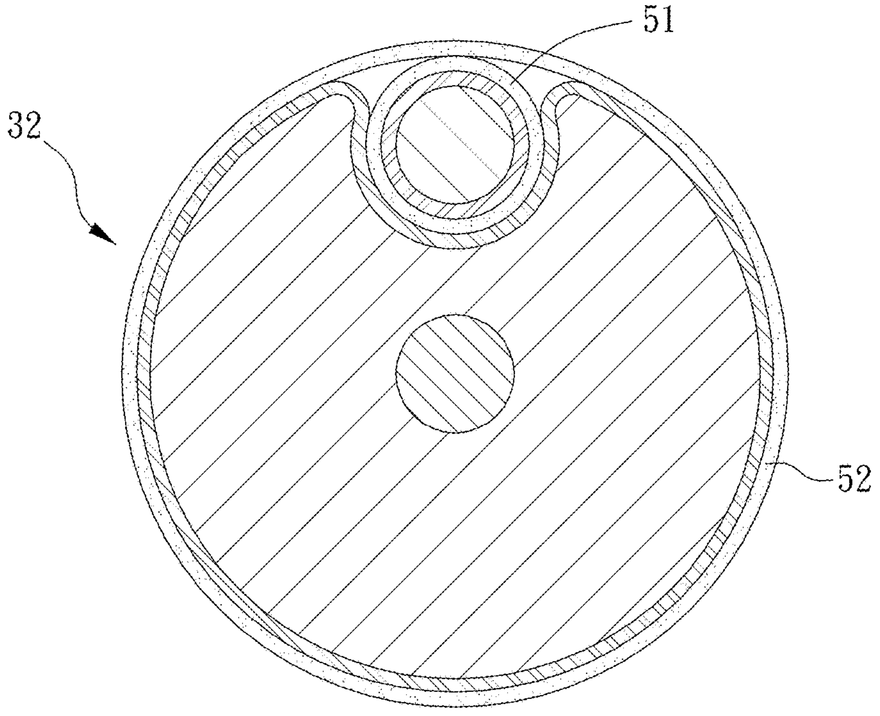
Figure 4:
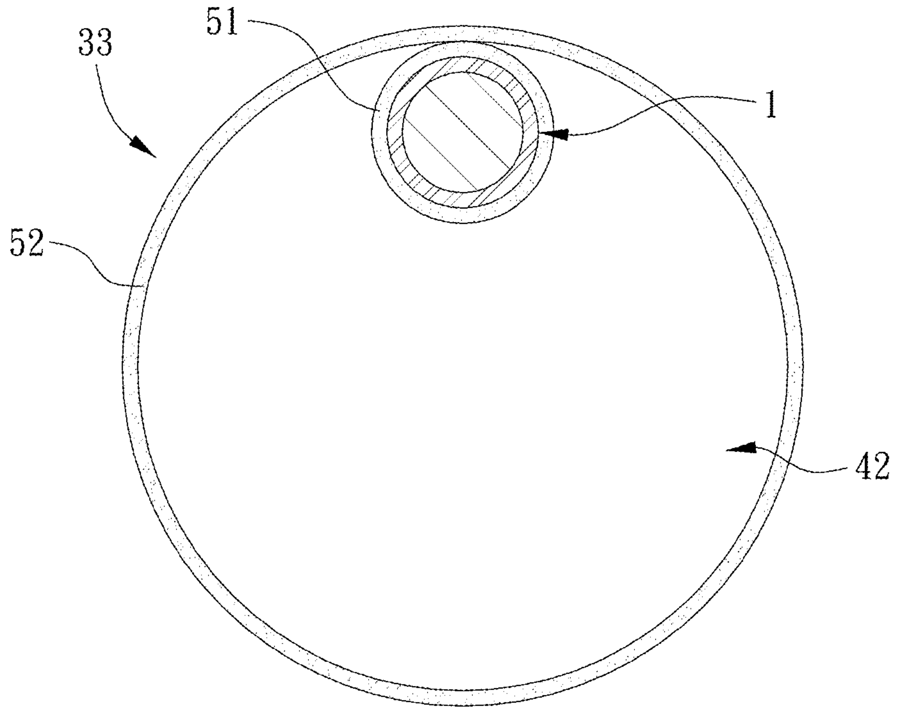
Figure 5:
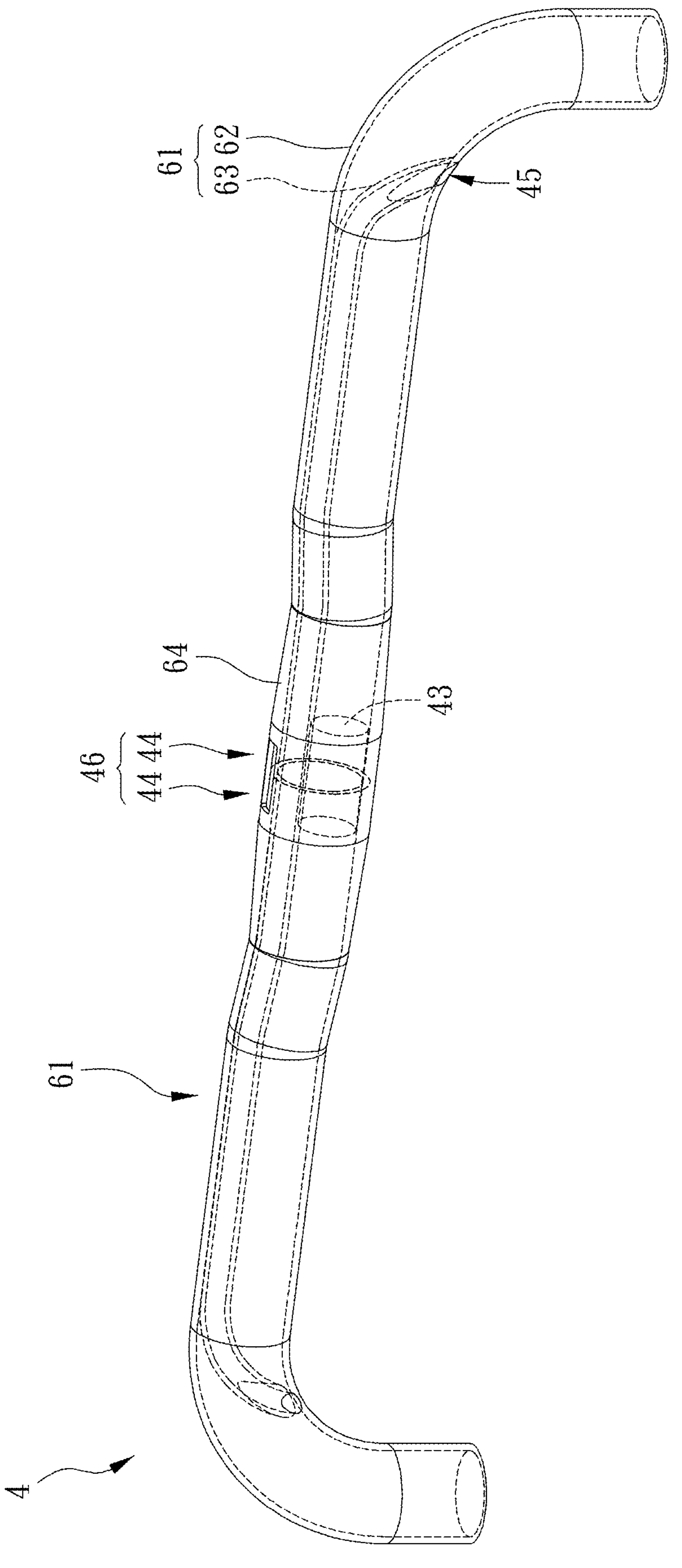
FIG. 5 is a schematic diagram of a bicycle handlebar according to an exemplary embodiment of the present invention.
Figure 6:
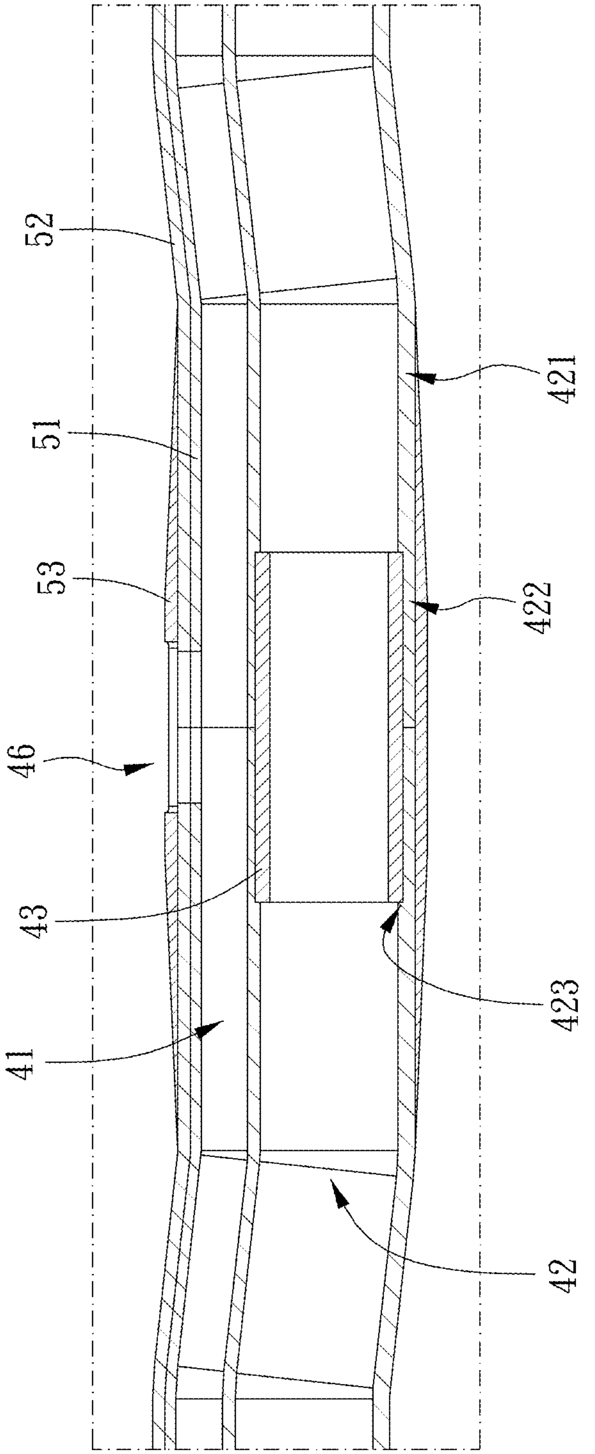
FIG. 6 is a partial cross-sectional view of FIG. 5.

Please refer to FIGS. 1 to 6 for an exemplary embodiment of the present invention. A manufacturing method of a bicycle handlebar of the present invention includes the following steps of: preparing a first mandrel 1 and a plurality of first carbon fiber layers 51, wrapping the plurality of first carbon fiber layers 51 around the first mandrel 1 to form a first component 31; preparing a second mandrel 2 and a plurality of second carbon fiber layers 52, the second mandrel 2 having an assembly groove 21, placing the first component 31 within the assembly groove 21, wrapping the plurality of second carbon fiber layers 52 around the second mandrel 2 and the first component 31 to form a second component 32; removing the second mandrel 2 from the second component 32 to form an assembled component 33, the assembled component 33 including a second channel 42; preparing a connection member 43 and two said assembled components 33, inserting the connection member 43 into the second channel 42 of each of the two said assembled components 33 to form a preformed tube 4; placing the preformed tube 4 into a mold for molding through a heating and pressing process; and removing the first mandrel 1 from each of the two said assembled components 33 to form a first channel 41 to obtain a finished product.

Specifically, the preformed tube 4 includes a first opening 44 and a second opening 45 each in communication with the first channel 41 of one of the two said assembled components 33, and the first opening 44 and the second opening 45 in communication with each other and define a third opening 46. The first opening 44 and the second opening 45 allow control wires to pass into or out from the first channel 41. The first channel 41 can effectively provide sufficient space for the control wires to pass through, and the first channel 41 can precisely guide the control wires, which is greatly beneficial for wiring operations. The third opening 46 may be rectangular, providing sufficient space for wiring and allowing the control wires to have appropriate space for bending.

Preferably, in the direction perpendicular to the opening of the third opening 46, the third opening 46 has a dimension less than a dimension of the connection member 43, which ensures better structural strength at the junction of the two assembled components 33.

Furthermore, the manufacturing method of the bicycle handlebars further includes the following steps of: preparing a plurality of third carbon fiber layers 53, wrapping the plurality of third carbon fiber layers 53 around the junction of the two assembled components 33 to obtain the preformed tube 4. Specifically, the connection member 43 can support at the junction of the two assembled components 33, and the plurality of third carbon fiber layers 53 are wrapped around to strengthen the junction, ensuring that the junction can be stably connected to withstand external forces. In this embodiment, the connection member 43 is made of carbon fiber, and when the connection member 43 is inserted into the second channel 42, the connection member 43 is within the coverage range of the plurality of third carbon fiber layers 53, allowing for extensive reinforcement on the outer layer by using the plurality of third carbon fiber layers 53, while the connection member 43 reinforces the inner portion of the preformed tube 4.

The first mandrel 1 includes a first inner core 12 and a first plastic layer 13, and the first plastic layer 13 is disposed around the first inner core 12. The first mandrel 1 can be bent and deformed as needed, where the first inner core 12 controls the inner diameter and shape of the first channel 41, and the first plastic layer 13 allows the first mandrel 1 to smoothly detach from the plurality of first carbon fiber layers 51. In this embodiment, the material of the first inner core 12 is made of silicone, and the first plastic layer 13 is a release film.

The second mandrel 2 further includes an elongated member 22, a second inner core 23 and a second plastic layer 24, the second inner core 23 is disposed around the elongated member 22, and the second plastic layer 24 is disposed around the second inner core 23. In this embodiment, the elongated member 22 is made of aluminum, the second inner core 23 is made of silicone, and the second plastic layer 24 is a release film.

It is noted that the second channel 42 includes a large diameter section 421 and a small diameter section 422, and the large diameter section 421 and the small diameter section 422 form a stepped portion 423 therebetween. The large diameter section 421 is configured to receive a portion of the connection member 43, and the stepped portion 423 abuts against the connection member 43 to jointly clamp and limit the connection member 43 when the connection member 43 is inserted into the large diameter section 421 of the second channel 42. In this embodiment, the connection member 43 is a hollow tube, which allows the second channel 42 to remain open for the subsequent configuration of other components.

The present invention further provides a bicycle handlebar manufactured by the aforementioned manufacturing method. The bicycle handlebars include two connecting assemblies 61, the connection member 43, and a reinforcement member 64. Each of the two connecting assemblies 61 includes an outer tubular member 62 and an inner tubular member 63, the outer tubular member 62 includes the plurality of second carbon fiber layers 52 and has the second channel 42, and the inner tubular member 63 is positioned on an inner wall of the second channel 42 and includes the plurality of first carbon fiber layers 51 and has the first channel 41. The inner tubular member 63 includes at least one first opening 44 and a plurality of second openings 45 opened in the outer tubular member 62. The connection member 43 is inserted into the second channels 42 of the two connecting assemblies 61 respectively. The reinforcement member 64 includes the plurality of third carbon fiber layers 53, and covers the junction of the two connecting assemblies 61.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A manufacturing method of a bicycle handlebar including steps of:

preparing a first mandrel and a plurality of first carbon fiber layers, wrapping the plurality of first carbon fiber layers around the first mandrel to form a first component;

preparing a second mandrel and a plurality of second carbon fiber layers, the second mandrel having an assembly groove, placing the first component within the assembly groove, wrapping the plurality of second carbon fiber layers around the second mandrel and the first component to form a second component;

removing the second mandrel from the second component to form an assembled component, the assembled component including a second channel;

preparing a connection member and two said assembled components, inserting the connection member into the second channel of each of the two said assembled components to form a preformed tube;

placing the preformed tube into a mold for molding through a heating and pressing process; and removing the first mandrel from each of the two said assembled components to form a first channel to obtain a finished product.

2. The manufacturing method of claim 1, wherein the first mandrel includes a first inner core and a first plastic layer, and the first plastic layer is disposed around the first inner core.

3. The manufacturing method of claim 1, wherein the second mandrel further includes an elongated member, a second inner core and a second plastic layer, the second inner core is disposed around the elongated member, and the second plastic layer is disposed around the second inner core.

4. The manufacturing method of claim 1, wherein the second channel includes a large diameter section and a small diameter section, the large diameter section and the small diameter section form a stepped portion therebetween, the large diameter section is configured to receive a portion of the connection member, and the stepped portion is abutted against the connection member.

5. The manufacturing method of claim 1, wherein the preformed tube includes a first opening and a second opening each in communication with the first channel of one of the two said assembled components, and the first opening and the second opening in communication with each other and define a third opening.

6. The manufacturing method of claim 5, wherein the third opening has a dimension of the third opening is less than a dimension of the connection member.

7. The manufacturing method of claim 6, wherein the first mandrel includes a first inner core and a first plastic layer, and the first plastic layer is disposed around the first inner core; the second mandrel further includes an elongated member, a second inner core and a second plastic layer, the second inner core is disposed around the elongated member, and the second plastic layer is disposed around the second inner core; the second channel includes a large diameter section and a small diameter section, the large diameter section and the small diameter section form a stepped portion therebetween, the large diameter section is configured to receive a portion of the connection member, and the stepped portion is abutted against the connection member; the connection member is a hollow tube; the method of manufacturing bicycle handlebars further includes steps: preparing a plurality of third carbon fiber layers, and wrapping the plurality of third carbon fiber layers around a junction of the two said assembled components to obtain the preformed tube; in a direction which the connection member is inserted into the second channel, the connection member is within the coverage range of the plurality of third carbon fiber layers; the material of the first inner core is made of silicone; the material of the second inner core is made of silicone; the material of the connection member is made of carbon fiber.

8. The manufacturing method of claim 1, further including steps of: preparing a plurality of third carbon fiber layers, and wrapping the plurality of third carbon fiber layers around a junction of the two said assembled components to obtain the preformed tube.

9. The manufacturing method of claim 8, wherein in a direction which the connection member is inserted into the second channel, the connection member is within the coverage range of the plurality of third carbon fiber layers.

10. A bicycle handlebar manufactured by the manufacturing method of claim 8, including:

two connecting assemblies, each of the two connecting assemblies including an outer tubular member and an inner tubular member, the outer tubular member including the plurality of second carbon fiber layers and having the second channel, the inner tubular member being positioned on an inner wall of the second channel and including the plurality of first carbon fiber layers and having the first channel, the inner tubular member including at least one first opening and a plurality of second openings opened in the outer tubular member;

the connection member inserted into the second channels of the two connecting assemblies respectively; and a reinforcement member including the plurality of third carbon fiber layers, and covering the junction of the two connecting assemblies.

* * * * *